Patented July 22, 1930

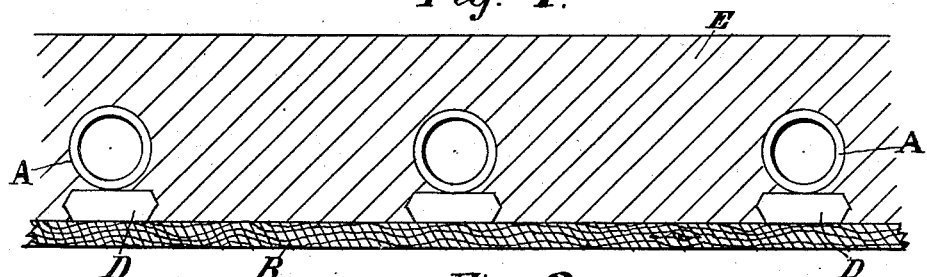
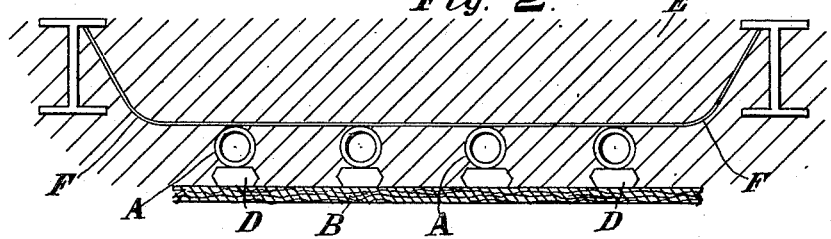
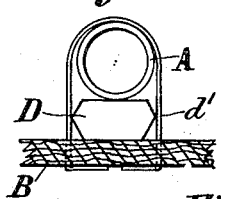
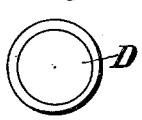
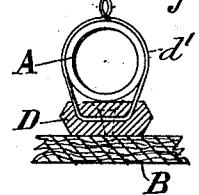
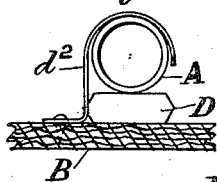
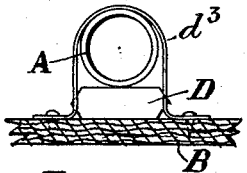
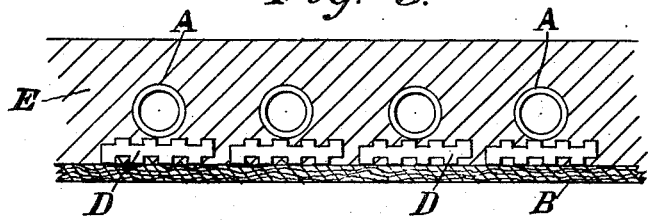

1,771,268

UNITED STATES PATENT OFFICE

JOSEPH LESLIE MUSGRAVE, OF LONDON, ENGLAND

HEATING AND COOLING OF BUILDINGS

Application filed December 29, 1927, Serial No. 243,414, and in Great Britain January 28, 1927.

This invention relates to the heating and cooling of buildings by the circulation of a heating or cooling fluid through a system of pipes embedded in a material which diffuses the heat or cold over a given area, such heat or cold being transmitted to the plaster or other material forming the surface from which it radiates, and has special reference to the method of heating and cooling known as the panel system. The invention has for its object to devise new means for supporting or holding the pipes or tubes through which the heating or cooling fluid circulates, and which at the same time acts as a distributor to create a more uniform temperature over whole of the surface from which the heat or cold radiates.

In this system of heating it has been customary to construct a "shuttering" or structure to support or hold the material in which the pipes are embedded while in a plastic state, such pipes being placed in direct contact with the "shuttering" or against a structure of metal in contact with the "shuttering", leaving the pipes partially exposed, after the "shuttering" has been removed, until the plaster forming the finished surface is laid on.

In factories and stores and such like buildings it is frequently desired to omit the plastering to save expense and upkeep. In order however to secure the requisite efficiency of radiating effect from the surface of the walls or ceiling it is essential that the pipe surface should be covered with a certain thickness of plaster or concrete.

Now according to this invention I obtain this covering and at the same time increase the efficiency of the system by interposing between the "shuttering" or equivalent a number of distance pieces arranged either intermittently or in a practically continuous line, against or upon which the pipes are laid. The distance pieces may be formed or cast of cement and sand, fine concrete, terracotta, brick material or the like, or in some cases they may be made of metal, preferably coated with a non-corrosive material. In cases where a finished surface of plaster is laid on the outer surface of the distance pieces, and the inner surface also if desired, may be corrugated and the edges preferably chamfered. The distance pieces may be laid parallel with the pipes or at right angles thereto.

The invention is illustrated on the accompanying drawing.

Fig. 1 is a view showing the pipes through which the fluid circulates with distance pieces interposed between them and the "shuttering".

Fig. 2 is a view showing one method by which the pipes are held on the distance pieces so as to prevent them getting out of position when being embedded.

Fig. 3 is a similar view to Fig. 1 showing distance pieces between the pipes and "shuttering" which form a practically continuous line and of a width such as to leave only a small space between the distance pieces upon or against which the adjacent pipes are rested.

Fig. 4 shows a method of holding the pipes and distance pieces in position.

Fig. 5 is a part sectional view showing how the holding medium may be embedded in the distance pieces during the process of moulding same.

Figs. 6 and 7 show further methods of holding the pipe and distance pieces in position.

Fig. 8 is a plan view of a circular shape distance piece.

Fig. 9 is a plan view of a corrugated oblong shape distance piece.

A represents the pipes or tubes through which the fluid is circulated, B the "shuttering", and D the distance pieces interposed between the pipes and the "shuttering" and upon or against which said pipes are laid.

At Fig. 1 I have shown the pipes A embedded in the material E that diffuses the heat or cold with the distance pieces D interposed between them and the "shuttering" B. When the material E is set the "shuttering" B is removed and the surface may be left, or coated or covered in the usual known manner with distemper or paint from the surface of which the heat or cold radiates.

In the example illustrated by Fig. 2 I have shown one method of holding the pipes A in position on the distance pieces D so as to enable the material E to be filled in without displacing said pipes, by the use of bars F suitably arranged to bear upon the pipes A. These bars F may also act as a reinforcing medium for the concrete or other material E.

At Fig. 3 I have shown the pipes A embedded in the material E that diffuses the heat or cold with distance pieces D, interposed between the "shuttering" B and the pipes A, forming a practically continuous line and of a width such as to leave only a small space between the one line of distance pieces and the adjacent lines of distance pieces. The distance pieces are also shown with their outer and inner surfaces corrugated, which corrugations, when the "shuttering" B is removed, act as keys for the plaster with which the outer surface is covered and from which the heat radiates, the corrugations on the upper surface acting as keys for the concrete in which the pipes A are embedded.

At Fig. 4 I have shown how the pipes and distance pieces D may be secured in position by wires $d'$ passing around the pipes and through the "shuttering" B. Or if desired wires $d'$ may be embedded in the distance pieces during the process of casting or moulding said distance pieces, as shown by Fig. 5, and the distance pieces may be held to the "shuttering" by screws or nails or other means.

Fig. 6 shows a further method of holding the pipes A and distance pieces D in position by clips $d^2$ which are fixed to the "shuttering", and Fig. 7 shows the pipes A and distance pieces D held in position by a strap $d^3$ fixed to the "shuttering".

What I claim as my invention and desire to secure by Letters Patent is:—

1. In a building having a surfacing structure molded from plastic material, pipes for the flow of a heating or cooling fluid embedded in said material and spaced from the surface thereof, and individual distance pieces also embedded in said material and located between said pipes and said surface in contact with said pipes and exposed at said surface.

2. In a building having a surfacing structure molded from plastic material, pipes for the flow of a heating or cooling fluid embedded in said material and spaced from the surface thereof, and individual distance pieces also embedded in said material between said pipes and surface and having rear corrugated surfaces contacting with said pipes and having outer corrugated surfaces exposed at the first named surface.

In testimony whereof I have signed my name to this specification.

JOSEPH LESLIE MUSGRAVE.